United States Patent [19]

Darbyshire

[11] Patent Number: 5,797,652
[45] Date of Patent: Aug. 25, 1998

[54] LUMBAR SUPPORT ADJUSTMENT

[75] Inventor: Paul Darbyshire, Moorabbin, Australia

[73] Assignee: Henderson's Industries Pty Ltd., Australia

[21] Appl. No.: 765,700

[22] PCT Filed: Jul. 12, 1995

[86] PCT No.: PCT/AU95/00421

§ 371 Date: Jan. 15, 1997

§ 102(e) Date: Jan. 15, 1997

[87] PCT Pub. No.: WO96/02166

PCT Pub. Date: Feb. 1, 1996

[30] Foreign Application Priority Data

Jul. 20, 1994 [AU] Australia ................ PM6941

[51] Int. Cl.$^6$ .................................................. A47C 7/46
[52] U.S. Cl. .......................... 297/284.4; 297/284.2; 297/284.8
[58] Field of Search ............... 297/284.2, 284.4, 297/284.8; 74/424.86

[56] References Cited

U.S. PATENT DOCUMENTS

| | | | |
|---|---|---|---|
| 2,338,271 | 1/1944 | Ulanet | 74/424.8 B |
| 4,462,635 | 7/1984 | Lance | 297/284.2 |
| 4,469,374 | 9/1984 | Kashihara et al. | |
| 5,507,559 | 4/1996 | Lance | 297/284.4 |

FOREIGN PATENT DOCUMENTS

| | | |
|---|---|---|
| 0 026 668 | 4/1981 | European Pat. Off. |
| 3204-540-A | 8/1981 | Germany. |
| 3616-832-A | 11/1989 | Germany. |
| 3817-086-A | 11/1989 | Germany. |
| 4132-318-A | 4/1992 | Germany. |
| 4228637-A1 | 3/1994 | Germany. |
| 547074 | 3/1974 | Switzerland. |
| 873680 | 7/1961 | United Kingdom ............ 74/424.8 B |
| 2035792 | 6/1980 | United Kingdom ............ 297/284.4 |
| WO 94/08492 | 4/1994 | WIPO ............ 297/284.4 |

OTHER PUBLICATIONS

Derwent Abstract Accession No. G2340 B/29, Class Q14, SU, 513611, A (Bremshey AG) 9 Aug. 1978.

*Primary Examiner*—Milton Nelson, Jr.
*Assistant Examiner*—Anthony D. Barfield
*Attorney, Agent, or Firm*—Lerner, David, Littenberg, Krumholz & Mentlik

[57] ABSTRACT

Lumbar support assemblies are disclosed including a support band extending across a seat backrest, a mounting mechanism at at least one end of the support band, and a drive mechanism interconnecting the mounting mechanism for adjusting the band between relaxed and tension conditions, the drive mechanism including a pair of movable parts for adjusting the band tension. The axis of the drive mechanism extends longitudinally of the support band and includes a pair of spindles arranged telescopically so that their longitudinal extent varies in response to relative rotation about the axis.

5 Claims, 4 Drawing Sheets

LUMBAR SUPPORT ADJUSTMENT

This invention relates to adjustable lumbar supports for seats and chairs, and is particularly although not exclusively concerned with such supports as used in association with motor vehicle seats. It will be convenient to hereinafter describe the invention with particular reference to motor vehicle seats, but it is to be understood that the invention has wider application. By way of example, the invention may be adopted in aircraft seats, train seats, shipboard seats, and chairs as used for office or recreational purposes.

Adjustable lumbar supports tend to be complex and of relatively expensive construction. The actuator through which adjustment is effected presents a particular problem because of its bulk and consequent limitations on where it can be located within the seat assembly. Some actuators are of such bulk that they need to be located remote from the lumbar support, and that necessitates the provision of complex and expensive means for drivably connecting the actuator to the lumbar support.

It is an object of the present invention to provide a relatively simple and inexpensive lumbar support assembly. It is a further object of the invention to provide such an assembly which can be quickly and conveniently attached to or removed from a seat. Still another object of the invention is to provide an improved lumbar support adjustment actuator which is of relatively compact construction and which requires relatively low effort to operate.

A lumbar support adjuster according to the present invention is characterised in that the drive mechanism which is operative to cause the adjustment of the lumbar support, extends and contracts between two conditions which correspond to the lumbar support fully relaxed (full-off) and fully tensioned (full-on) conditions respectively. As the drive mechanism moves towards the fully contracted condition, a first part of that mechanism moves relative to a second part so as to reduce the overall size of the mechanism, and each said part also moves relative to a mounting to which the drive mechanism is attached. By way of example, the first part may move into and out of the second part so as to vary the size of the mechanism in much the same way as occurs with a collapsing telescope. In one particular the drive mechanism includes a drive spindle having two coaxial parts, one of which moves axially into the other as the drive mechanism contracts. It is preferred that the mechanism is mechanical in nature, and it further preferred that the mechanism is essentially a screw mechanism.

According to one form of the invention, the screw mechanism includes an outer spindle part and a coaxial inner spindle part which are rotatable relative to one another and which are also movable axially relative to one another. The outer spindle part is tubular and has both an external screw thread and an internal screw thread, and those threads are of different hand. The inner spindle part has an external screw thread which matches and cooperates with the internal thread of the outer part. The internal thread of the outer part cooperates with an internal thread of a nut or the like which is held against rotation with the outer spindle part and which may form part of or be attached to the aforementioned mounting. In the installed condition of the mechanism, the inner spindle part is also held against rotation with the outer spindle part.

The arrangement is such that rotation of the outer spindle part in one direction relative to the cooperable nut causes that part to move axially in a particular direction. At the same time cooperation between the engaging threads of the outer and inner parts causes the non-rotating inner part to be moved axially relative to the outer part in the same direction as that in which the outer part is moving. The result is that the overall axial length of the drive spindle is either extended or reduced according to the direction of rotation of the outer part of the spindle. Furthermore, such extension or reduction results from two components of movement. One is the axial movement of the spindle outer part, and the other is the simultaneous axial movement of the inner part relative to the outer part which occurs in the same direction as that in which the outer part is moving.

In use, the fully extended condition of the drive spindle may correspond to the "full-off" condition of the lumbar support at which that support has maximum rearward curvature. The fully contracted condition of the drive spindle will then correspond to the "full-on" condition of the lumbar support at which that support has minimum rearward curvature.

A lumbar support assembly incorporating the improved actuator arrangement as described in the immediately preceding paragraph, can be of extremely simple construction. The lumbar support member, which may be a strap, band, or the like, can be connected directly to the drive mechanism thereby eliminating the need for cables and other complex forms of drive connection. In particular, the drive spindle of the actuator may extend generally in the same axial direction as the lumbar support member.

It is preferred that such an assembly includes a mounting section at each end of the support, and that each of those mounting sections is adapted to clip-on a seat frame or be otherwise connected to the frame in a manner such as to permit convenient attachment and detachment of the assembly. The actuator can be carried by one of those mounting sections. According to one arrangement, each mounting section may be cooperable with the wire or rod part of a seat backrest frame which forms the core of the seat backrest side wing or bolster.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

Figure 1:
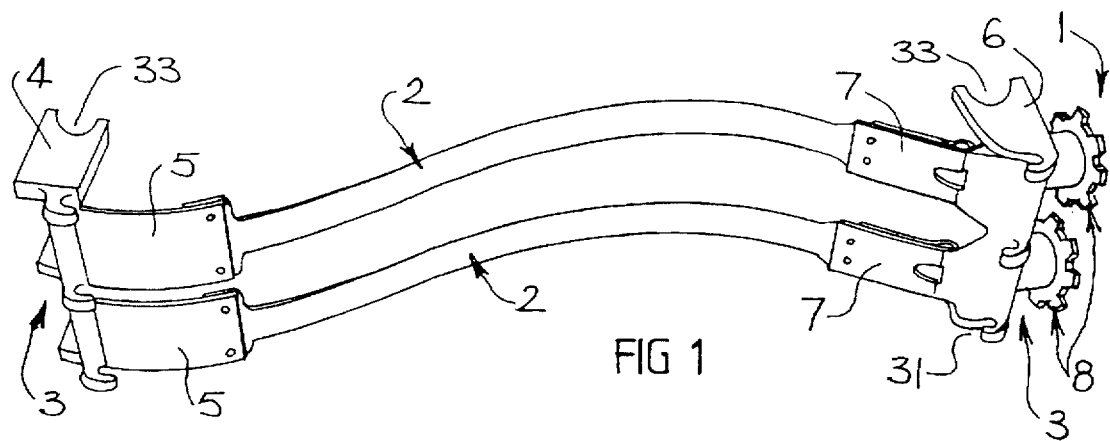
FIG. 1 is a semi-diagrammatic perspective view of an example lumbar support assembly incorporating an embodiment of the invention.

FIG. 1 of the drawings shows an example lumbar support assembly 1 having two strap-like support members 2 and a separate actuator 3 for adjusting each of those members 2. It is to be understood however, that the invention is applicable to assemblies having a greater or a smaller number of support members 2. In particular, there may be a single support member 2 and a single actuator 3 associated with that member.

In the particular example shown, each support member 2 is a flexible band-like member made of a suitable material such as a plastics material.

Preferably, the member 2 is made as a single piece, but it could be made up of two or more interconnected pieces. A mounting bracket 4 is connected to one end 5 of each of the bands 2, and another mounting bracket 6 is connected to the other end 7 of each of the bands 2. In the arrangement shown, the band ends 5 are passive or inactive ends in that they do not move relative to the bracket 4, whereas the band ends 7 are movable relative to the bracket 6 and are therefore active ends. Each active end 7 is connected to a respective actuator 3 which, in the arrangement shown, is operable through manipulation of a hand wheel 8. Rotation of the hand wheel 8 in one direction will cause the associated band end 7 to be moved away from the other end 5 so as to thereby reduce the rearward curvature of the band 2. Rotation of the hand wheel 8 in the opposite direction will have the reverse effect.

The assembly 1 shown in FIG. 1 is simply an example application of the invention and could be varied in a number of ways. By way of example as stated above the assembly 1 may include a single band 2 rather than two bands as shown. In addition, an adjusting actuator 3 may be provided at both ends of the band 2 rather than at one end as shown. Furthermore, a shield of suitable material could be provided between the or each band 2 and the cushion material of a seat backrest so as to reduce frictional resistance to longitudinal movement of the band between fully tensioned and fully relaxed conditions. If a shield is adopted in a multiple band arrangement as shown in FIG. 1, it could extend across the space between the two bands 2 and could be contoured in a direction transverse to the bands 2. With such an arrangement relative adjustment of the tension in the two bands 2 can cause the zone of primary support to be shifted from one band to the other, or to a location between the bands.

Figure 2:
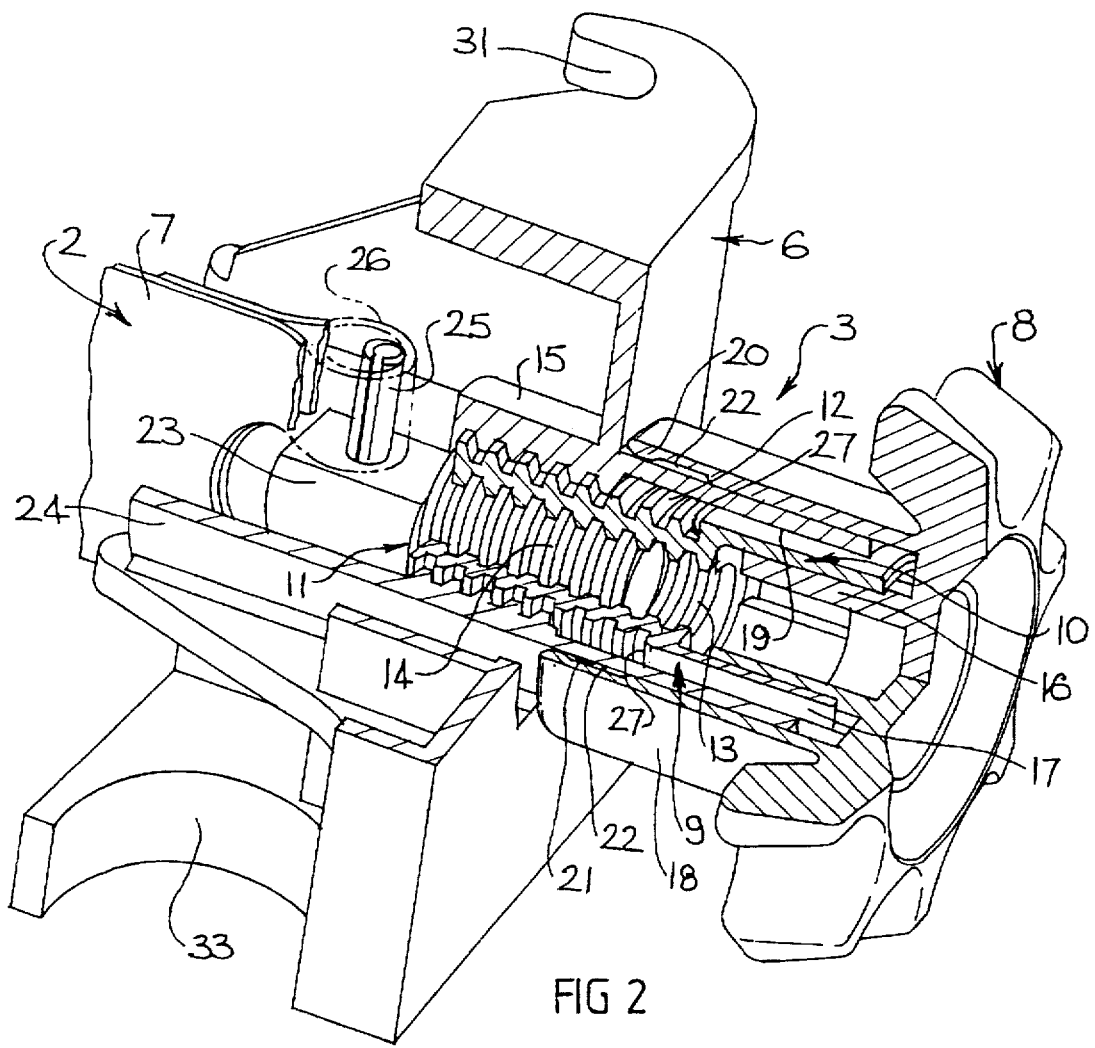
FIG. 2 is an enlarged partially sectioned view of drive mechanism as included in the assembly of FIG. 1 and which shows the drive mechanism in a condition corresponding to the fully tensioned condition of the lumbar support.
Figure 3:
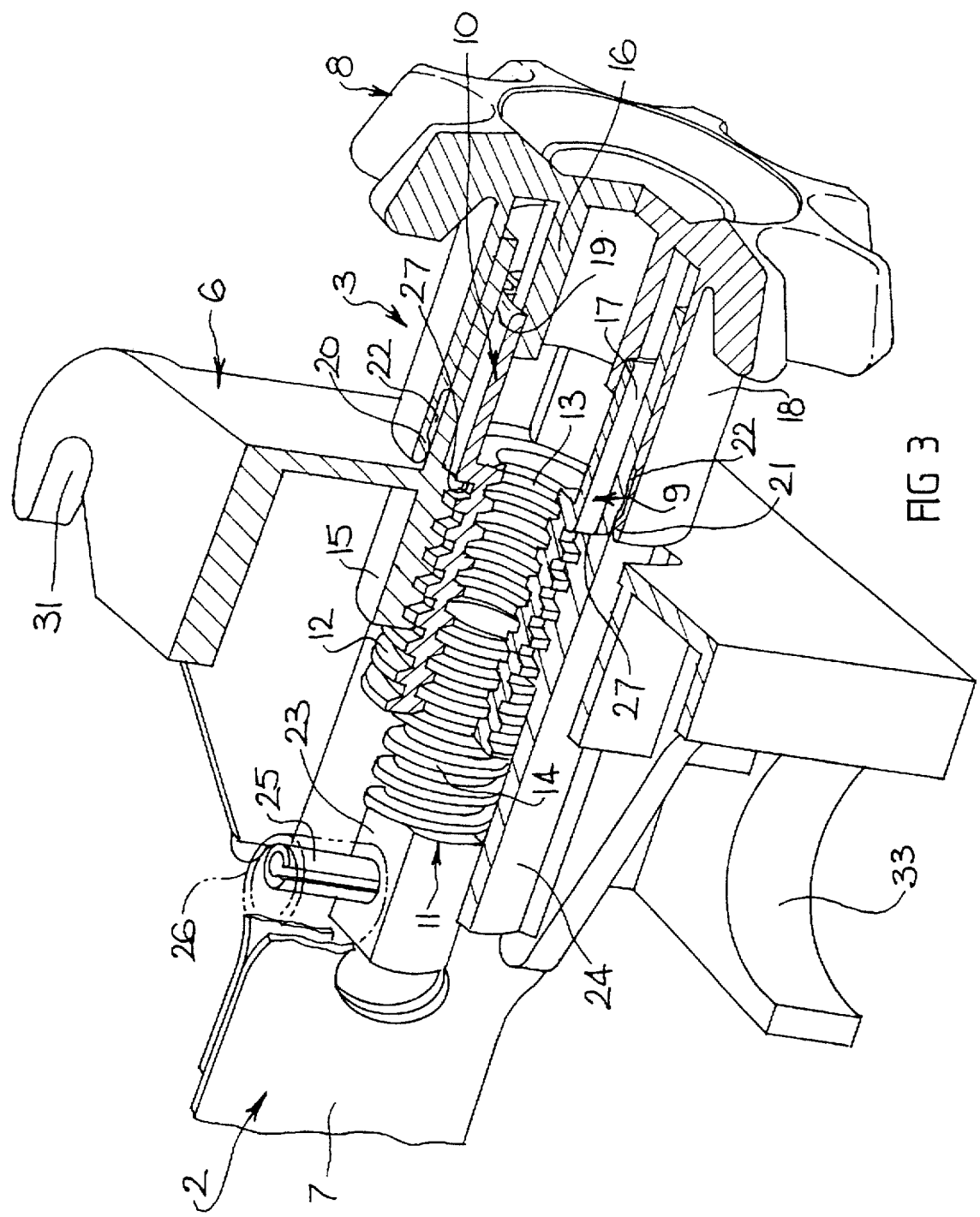
FIG. 3 is a view similar to FIG. 2 but showing the drive mechanism in a condition corresponding to a relaxed condition of the lumbar support.

An example actuator 3 according to the invention is shown by FIGS. 2 and 3. FIG. 2 shows the actuator 3 at the full-on condition in which the associated band 2 is held relatively taut across the seat backrest. FIG. 3 shows the actuator 8 at the full-off condition in which the associated band 2 is allowed maximum relaxation so that the depth of rearward curvature across the backrest is at a maximum.

In the example of FIGS. 2 and 3, the actuator 3 includes a drive spindle 9 having an outer tubular part 10 and an inner part 11 which is coaxial with the outer part 10 and is partly contained within that outer part. The outer part 10 has an external thread 12 of one hand (e.g. right hand) and an internal thread 13 of the opposite hand (e.g., left hand), and the inner part 11 has an external thread 14 which cooperatively engages with the internal thread 13 of the outer part 10. The external thread 12 of the outer part 10 cooperatively engages with the internal thread of a nut 15 which is preferably secured to or formed integral with the associated mounting bracket 6. The arrangement is such that the nut 15 is held against rotation with the outer part 10 of the spindle 9.

The hand wheel 8 is connected to the spindle outer part 10 in a manner such that the hand wheel 8 is operable to cause rotation of that part 10 whilst permitting relative axial movement of the part 10 and the hand wheel 8. In the particular arrangement shown, that connection includes an axial barrel-like extension 16 of the hand wheel 8 which locates within an end portion 17 of the spindle outer part 10 and cooperatively engages with that end portion in a manner such as to allow relative axial movement of the part 10 but prevent relative rotation. For that purpose, the barrel extension 16 and the spindle end portion 17 may have cooperable splines or the like. Alternatively, the barrel extension 16 and the spindle end portion 17 may have appropriate complementary non-circular cross-sectional shapes.

Any suitable means may be employed to retain the hand wheel 3 in cooperation with the spindle 9. In the arrangement shown that is achieved by providing the hand wheel 8 with an axially extending cylindrical sleeve 18 which is rotatably located on a tubular cylindrical boss 19 of the mounting bracket 6. The terminal end portion 20 of the sleeve 18 snaps over one or more radial projections 21 of the boss 19 which are thereby located within an internal circumferential groove 22 of the sleeve 18. The arrangement is such that rotation of the hand wheel 8 relative to the boss 19 is not hindered by the or each projection 21, whereas the or each such projection resists removal of the hand wheel 8 from the boss 19. It will be apparent that other arrangements could be adopted to achieve the same or similar result.

In order for the actuator 3 to operate in the manner intended, the spindle inner part 11 must be held against rotation relative to the outer part 10. That may be achieved in any suitable manner. In the arrangement shown, an axial extension 23 of the spindle inner part 11 is movable axially within a part 24 fixed to or formed integral with the mounting bracket 6. A lateral projection provided on that extension 23 may slidably locate in a slot or groove (not shown) provided in the part 24 so as to permit axial movement of the spindle part 11 relative to the bracket part 24, but prevent relative rotation between those parts. In the particular arrangement shown the aforementioned lateral projection is formed by the connection between the band 2 and the spindle 9 as hereinafter described. In an alternative arrangement the spindle extension 23 may have a non-circular cross-sectional shape and slidably located within a bore of complementary shape provided within the bracket part 24.

The active band end 7 may be connected to the actuator spindle 9 in any suitable fashion. As shown in the accompanying drawings that connection may include a pin 25 projecting laterally from each of two opposite sides of the spindle extension 23, and two looped stirrups 26 at the band end 7 which locate over a respective one of the pins 25. Each pin 25 and the associated stirrup 26 may form the lateral projection referred to above.

An actuator 3 as described operates in the following manner.

When the hand wheel 8 as shown in FIG. 2 is turned anti-clockwise the spindle outer part 10 is rotated accordingly and cooperation between the thread 12, and the nut 15 causes that spindle part 10 to be moved axially to the left of FIG. 2. At the same time, cooperation between the threads 13 and 14 (which are of a hand opposite to that of the thread 12) causes the spindle inner part 11 to be moved axially in the same direction relative to the outer part 10. That dual axial movement has the effect of increasing the response to rotation of the hand wheel 8. In particular, the distance which the band end 7 moves towards the opposite band end 5 for a given degree of hand wheel rotation, is greater than which would result if the band 2 was connected direct to the spindle outer part 10. Also, that relatively large degree of band end movement is achieved with little effort because the helix angle of the various threads can be kept relatively small.

At the full-off position of the actuator 3 as shown in FIG. 3, a shoulder 27 of the spindle outer part 10 engages an opposed surface of the mounting bracket 6, but other stop arrangements could be adopted. Similarly, any suitable stop arrangement could be adopted to prevent the actuator 3 being moved beyond the full-on position as shown in FIG. 2.

Each of the mounting brackets 4 and 6 can be constructed to suit particular requirements. In the arrangement shown, those brackets are constructed to permit convenient attachment to and removal from the frame 28 (FIGS. 4 and 5) of the seat backrest. It is also preferred that the brackets 4 and 6 are constructed to cooperate with existing parts of the frame 28.

Figure 4:
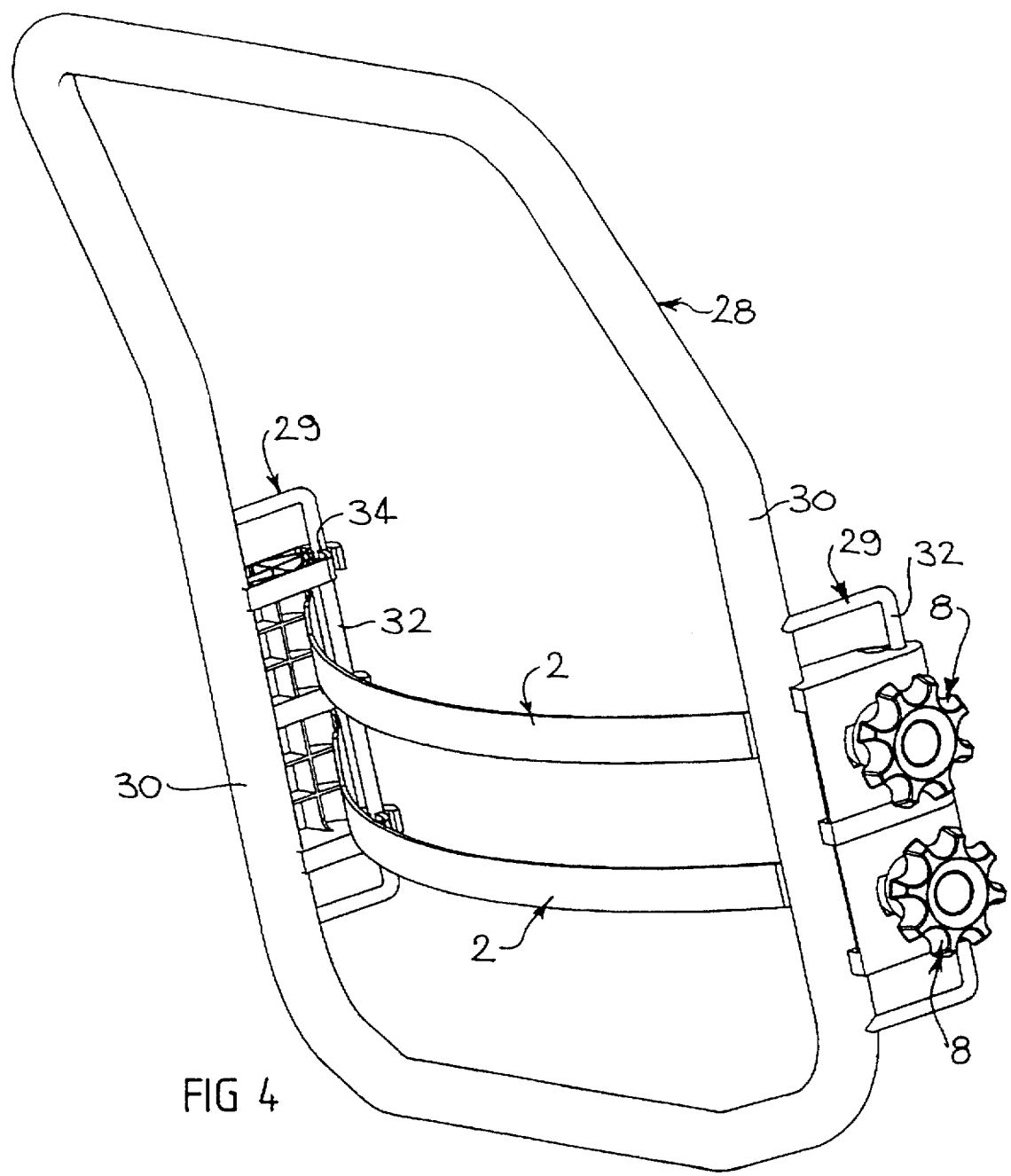
FIG. 4 is a rear perspective view of a seat backrest frame to which is attached a lumbar support assembly as shown in FIG. 1.
Figure 5:
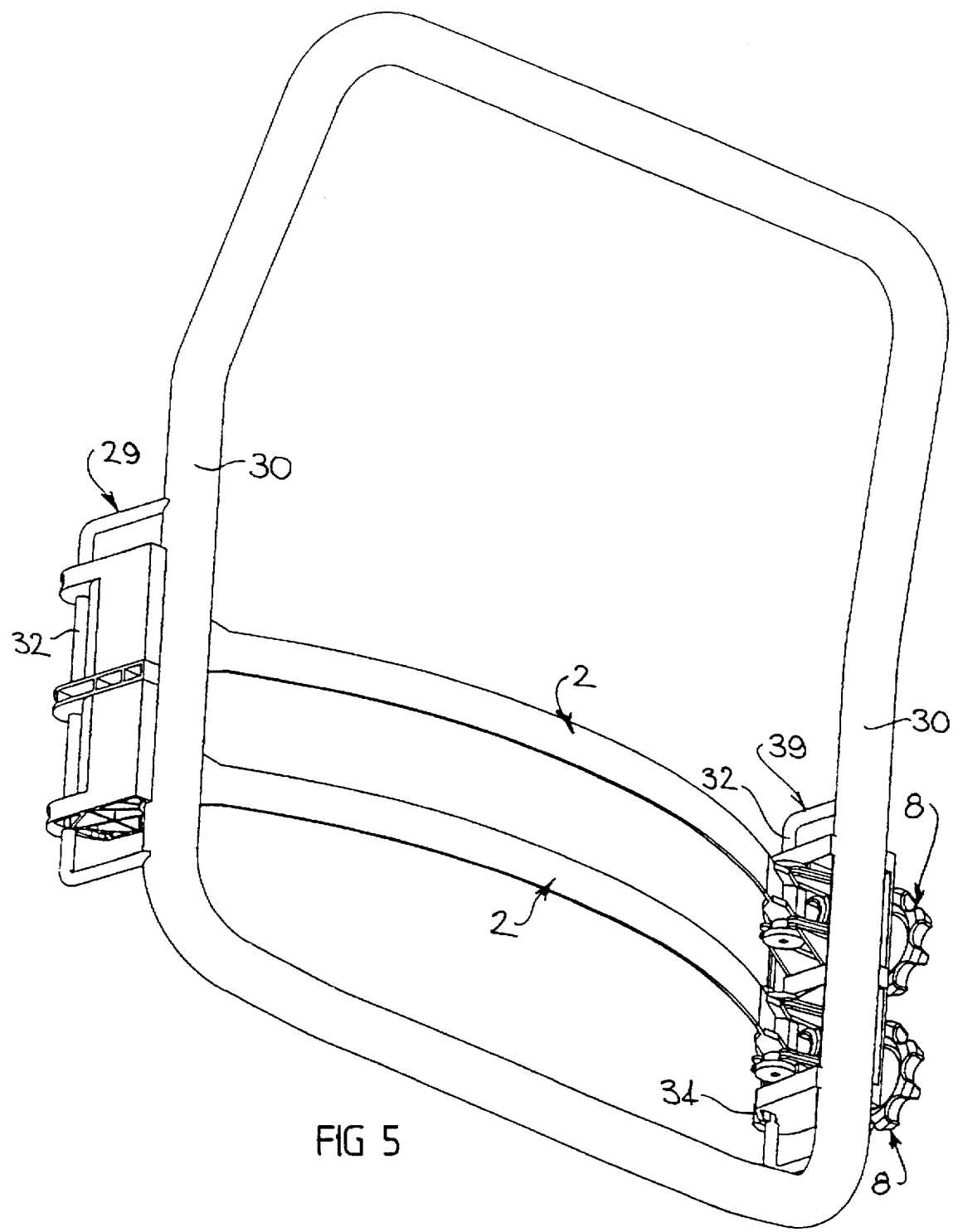
FIG. 5 is a view similar to FIG. 4 but showing the seat backrest frame from the front.

The backrest frame 28 shown in FIGS. 4 and 5 has a U-shaped section 29 of rod or wire secured to each side member 30 of the frame. Such a section 29 is typically provided to form the core of the side wings or bolsters of the seat backrest. In a preferred arrangement according to the present invention, each mounting bracket 4 and 6 of the lumbar support assembly is adapted to cooperate with a respective rod or wire section 29. In particular, it is preferred that each bracket 4 and 6 is arranged so that opposite edge portions of the bracket bears against the section 29 and the associated frame member 30 respectively. For that purpose, each edge portion may have an arcuate recess to fit against the section 29 or the member 30, whichever is the case.

FIGS. 2 and 3 show an example bracket recess 31 for locating over the crossbar 32 of a rod or wire section 29, and an example recess 33 for engaging with the frame side member 30. Locking means may be provided to resist separation of a bracket 4 or 6 from its installed position on a seat frame 28, and one such locking means can be seen in FIGS. 4 and 5. That locking means includes a flexible tongue-like detent 34 provided in at least one recess 31 of each bracket 4 and 6. The detent 34 is deflected to one side during insertion of the crossbar 32 into the relevant recess 31, and then snaps across to hinder removal of the bar 32 from the recess 31. The arrangement is such that the retaining influence of the detent 34 can be overcome when required.

It will be apparent that each bracket 4 and 6 can be mounted on the frame 28 in a manner different to that described with reference to the accompanying drawings. For example, instead of cooperating with rod or wire sections 29, the brackets may cooperate with metal plate sections secured to the seat backrest frame.

A lumbar support adjustment actuator according to the invention has the advantages of compactness and ease of operation for reasons which will be evident from the foregoing description of one embodiment. A lumbar support assembly including such an actuator has the advantages of simplicity and ease of installation.

Various alterations, modifications and/or additions may be introduced into the construction and arrangement of parts previously described without departing from the spirit or ambit of the invention as defined by the appended claims.

I claim:

1. A lumbar support assembly including, a support band, a mounting at least at one end of said band, drive mechanism interconnecting said mounting and said one end and being operable to adjust said band between relaxed and tensioned conditions when said assembly is in use, said mechanism including a first part connected to said mounting and a second part connected to said band, said first and second parts having a combined axial extent which reduces or increases according to whether said mechanism is operated to increase or reduce respectively the tension in said band, said first part including a tubular member having an external screw thread of one hand and an internal screw thread of the opposite hand, said external thread cooperatively engaging with a complementary threaded portion of said mounting, said second part including a screw threaded spindle which cooperatively engages with said internal thread, means connecting said spindle to said band one end for movement therewith during said adjustment of band tension, an actuator rotatably mounted on said mounting and connected to said mechanism, said actuator being held against axial movement relative to said mounting by means therefor while being operable to cause rotation of said tubular member about the longitudinal axis thereof relative to both said spindle and said threaded portion, said tubular member being responsive to said rotation to move axially relative to both said threaded portion and said actuator, said spindle being responsive to said rotation to move axially relative to said tubular member and the direction of said axial movement is the same for both said tubular member and said spindle so as to thereby cause said combined axial extent to increase or decrease according to the rotational direction of said tubular member.

2. An assembly according to claim 1 wherein said actuator is connected to said tubular member through a coupling which prevents relative rotation between said tubular member and said actuator but permits said tubular member to move in said axial direction relative to said actuator.

3. An assembly according to claim 1 wherein said band is connected to said screw threaded spindle for movement relative thereto about an axis extending transverse to the direction of said axial movement.

4. A seat including an assembly according to claim 1, wherein said mounting is attached to a side frame member of a seat backrest.

5. A lumbar support adjuster for adjusting a lumbar support band between relaxed and tensioned conditions, including a mounting, drive mechanism attached to said mounting and being operable to cause said adjustment, said mechanism including first and second parts having a combined axial extent which reduces or increases according to whether said mechanism is operated to increase or reduce respectively the tension in said band, said first part including a tubular member having an external screw thread of one hand and an internal screw thread of the opposite hand, said external thread cooperatively engaging with a complementary threaded portion of said mounting, said second part including a screw threaded spindle which cooperatively engages with said internal thread and is adapted to be connected to said band for movement therewith during said adjustment of band tension, an actuator rotatable mounted on said mounting and connected to said mechanism, said actuator being held against axial movement relative to said mounting by means therefor while being operable to cause rotation of said tubular member about the longitudinal axis thereof relative to both said spindle and said threaded portion, said tubular member being responsive to said rotation to move axially relative to both said threaded portion and said actuator, said spindle being responsive to said rotation to move axially relative to said tubular member and the direction of said axial movement is the same for both said tubular member and said spindle so as to thereby cause said combined axial extent to increase or decrease according to the rotational direction of said tubular member.

* * * * *

UNITED STATES PATENT AND TRADEMARK OFFICE
CERTIFICATE OF CORRECTION

PATENT NO. : 5,797,652
DATED : August 25, 1998
INVENTOR(S) : Darbyshire

It is certified that error appears in the above-identified patent and that said Letters Patent is hereby corrected as shown below:

Column 1, line 42, "particular the" should read --particular arrangement, the--.

Column 3, line 30, "If a" should read --If such a--.

Signed and Sealed this

Twelfth Day of January, 1999

*Attest:*

*Attesting Officer*   *Acting Commissioner of Patents and Trademarks*